US008433928B2

(12) United States Patent
Grebe et al.

(10) Patent No.: US 8,433,928 B2
(45) Date of Patent: Apr. 30, 2013

(54) PERSONALIZATION OF PORTABLE DATA STORAGE MEDIA

(75) Inventors: Alexander Grebe, Dorfen (DE); Andreas Kitzmann, München (DE); Wolfgang Rankl, München (DE); Claus Ebner, München (DE)

(73) Assignee: Giesecke & Devrient GmbH, Munich (DE)

( * ) Notice: Subject to any disclaimer, the term of this patent is extended or adjusted under 35 U.S.C. 154(b) by 921 days.

(21) Appl. No.: 12/374,915

(22) PCT Filed: Jul. 24, 2007

(86) PCT No.: PCT/EP2007/006575
§ 371 (c)(1),
(2), (4) Date: Jan. 23, 2009

(87) PCT Pub. No.: WO2008/012069
PCT Pub. Date: Jan. 31, 2008

(65) Prior Publication Data
US 2009/0327587 A1 Dec. 31, 2009

(30) Foreign Application Priority Data
Jul. 25, 2006 (DE) .......................... 10 2006 034 375

(51) Int. Cl.
G06F 11/30 (2006.01)
G06F 12/14 (2006.01)
(52) U.S. Cl.
USPC ............................................ 713/193; 726/26

(58) Field of Classification Search .................... 713/193
See application file for complete search history.

(56) References Cited

U.S. PATENT DOCUMENTS

| 6,202,155 | B1 * | 3/2001 | Tushie et al. ..................... 726/20 |
| 6,484,935 | B1 * | 11/2002 | Fischbacher .................. 235/376 |
| 6,729,549 | B2 * | 5/2004 | Hamann et al. ................ 235/492 |
| 6,971,025 | B1 * | 11/2005 | Droege et al. ................... 726/26 |
| 7,364,087 | B2 * | 4/2008 | Zimmer et al. ................ 235/492 |
| 7,942,333 | B2 * | 5/2011 | Vanore ............................ 235/492 |
| 2007/0016744 | A1 * | 1/2007 | Stocker et al. ................. 711/165 |
| 2007/0265855 | A1 * | 11/2007 | Maandag et al. .................. 705/1 |

OTHER PUBLICATIONS

Gilles Grimaud; Introducing Research Issues for Next Generation Java-based Smart Card Platforms; Year: 2003; pp. 1-4.*

* cited by examiner

Primary Examiner — Mohammad W Reza
Assistant Examiner — Monjour Rahim
(74) Attorney, Agent, or Firm — Bacon & Thomas, PLLC

(57) ABSTRACT

In a method for the personalization of portable data carriers into a non-volatile memory of the data carrier there are written personalization data, wherein the personalization at first is carried out as a virtual personalization in a virtual data carrier, then a memory image is generated as a bit-true image of a memory of the virtual data carrier and finally the memory image with the aid of its physical memory addresses is directly introduced into the memory of the real data carrier. Here the personalization data in addition to the initialization data also comprise individualization data. Preferably, the introduction of the personalization data into the data carrier can be carried out after the production of the data carrier at an authority issuing the data carrier or at the end user.

12 Claims, 1 Drawing Sheet

PERSONALIZATION OF PORTABLE DATA STORAGE MEDIA

FIELD OF THE INVENTION

The present invention relates to the personalization of portable data carriers, such as for example chip cards, mobile phone cards and the like, by providing the data carriers with digital data, in particular by introducing the data into non-volatile memories, also known as NVM (Non Volatile Memory), such as for example EEPROM memories or flash memories.

BACKGROUND

The process of the electrical personalization can be divided into two stages. In the first stage, the initialization, the data carrier is provided with general data which are identical for all data carriers of the same type. In the following this kind of personalization data is referred to as initialization data. In the second stage, the individualization, each data carrier is provided with individual data which for example contain data that adapt the individual data carrier to the end user. In the following this kind of personalization data is referred to as individualization data.

According to the prior art (Rankl, Wolfgang/Effing, Wolfgang: Handbuch der Chipkarten. Munich[4], 2002), accordingly, the personalization usually is carried out in two production steps which carry out the initialization and the individualization respectively. Usually, this takes place by the use of various plants and techniques. In the first step the identical initialization data are introduced into the data carriers to be personalized, in the second the individualization data.

The process of the personalization of data carriers is a critical step within the entire production process for data carriers, since the time required for writing the personalization data into the non-volatile memory of the data carrier is comparatively high and substantially influences the production costs. The step of initialization can be accelerated in that at first only one single data carrier is conventionally initialized by means of logical commands. Then a memory image of the entire memory of this data carrier is generated and used for initializing the further data carriers with the aid of the physical memory addresses.

Such a memory image is also referred to as image. Unlike a normal copy, an image is an exact bit-true image of the original and thus contains substantially more information than only the files stored on the original data carrier, for example also the structure of the file system and the like. This permits a fast generation of an exact bit-true reproduction of the data carrier, because here hardware functions and physical memory addresses can be directly used. It is also possible to generate a memory image only of parts of the whole memory and to introduce it directly into not used corresponding memory areas of a further data carrier or to introduce only parts of a memory image of a whole memory into a further data carrier. Thus, in particular data carriers can be personalized which in the memory area to be written into are still not provided with any structure and on which there is still not provided any file system.

A similar concept is described in WO 2004/107282 A1, in the method described therein from each further data carrier initialized per memory image then a reconversion routine is carried out for reconverting the non-volatile memory introduced with the memory image. The reconversion for example comprises that data which hitherto have been disguised on the basis of a random number $Z1$, such as e.g. keys, convert into data disguised on the basis of a random number $Z2$ individual for each data carrier.

The concept of using virtual data carriers for the personalization is known, too. U.S. Pat. No. 6,202,155 B1 describes a system for the personalization of transaction cards. The system receives information necessary for the personalization and creates a virtual card thereof. Virtual devices in this system control real physical personalization machines, which then produce the real transaction card based on the data of the virtual card. Specifications as to the technical realization of the individual personalization steps, in particular introducing the data into the cards, are not given there.

U.S. Pat. No. 6,729,549 B2 describes a system for the personalization of smart cards. Therein, the smart cards at first are virtually generated by means of a control program. The personalization of a real smart card then is effected by means of a personalization program accessing the virtual smart card. The smart cards to be personalized partly are already pre-initialized, in particular they have already a defined file structure which has already been imitated on generating the virtual smart card. The personalization data are written by the personalization program by means of smart-card-specific logical commands into the real smart card.

SUMMARY

The object of the present invention is to shorten the production time of the data carrier by accelerating the personalization process and thus to reduce the production costs.

The invention is based on the basic idea that the personalization of each data carrier at first is individually performed as a virtual personalization of a virtual data carrier. The virtual data carrier is adapted to simulate all features of the real data carrier, i.e. in particular also its hardware features. Then from a memory of the completely personalized virtual data carrier a memory image is generated. Then, with the aid of the physical memory addresses, the memory image is directly introduced into a respective memory of the real data carrier, the personalization data generated by the virtual personalization, in addition to the initialization data, also comprising the individualization data. All structure information about the file system and the like thus are transferred together with the memory image. This achieves the result that the hitherto separated production steps of the initialization and the individualization can be combined in one step by virtualization. Thus, a memory image individual for each data carrier can be generated which can be introduced fast into the data carrier, which distinctly reduces the production time: firstly in that only one production step for introducing the initialization and the individualization data is required, and secondly in that now with the aid of physical memory addresses the individualization data can be introduced into the data carrier faster, too.

Even the step of initialization, which according to the prior art hitherto has been carried out at first and separately, here, as described, is carried out virtual. Thus, the personalization data generated by the virtual personalization in general also contain the identical initialization data. This can also be application data, in particular Java packages and Java applets.

The virtual personalization can be carried out on a commercial standard personal computer. Special personalization devices are not necessary for this. In particular, the virtual personalization can be effected, for example, by means of a Java card simulator or a comparable simulation software.

The personalization data generated by the virtual personalization can be encrypted on the virtual data carrier. Thus, a secured introduction of the data in the form of the memory image into the real data carrier is ensured. After the personalization data having been introduced into the real data carrier, these can be decrypted on the real data carrier.

The introduction of the personalization data generated by the virtual personalization into the real data carrier not necessarily has to be effected directly during the production of the data carrier. It is possible that the data are not introduced into the data carrier and that it is personalized therewith until at the authority issuing the data carrier, i.e. for example at a bank, a supermarket or the like. An introduction of the data at the end user, for example via the Internet, is also conceivable. In this way the production time of the data carrier can be further reduced.

So as to permit such an introduction of the personalization data in a stage downstream in the production process, the data carrier for example can be pre-initialized only just to such an extent that it contains enough data to establish a secure connection with a personalization server of a personalizer, for example via the Internet, to authenticate itself there and thus to trigger a secured transfer of the data to be introduced in the form of the memory image generated by the virtual personalization before, without a further action of the authority issuing the data carrier or the end user becoming necessary. The personalization data are introduced into memory areas of the data carrier which are not involved in the pre-initialization and thus do not have any structure, in particular no file system or the like.

It is also possible that the data which are not introduced into the data carrier until at the authority issuing them or at the end user form only a part of the personalization data, the other part already having been introduced into the data carrier during the production of the data carrier, preferably directly as an image of a virtual memory. Some functionalities, such as for example basic GSM functions in the case of mobile phone cards, which are to be at the user's disposal directly after the issue of the data carrier, can be introduced into the data carrier e.g. still during the production process. Furthermore, it is possible that a part of the personalization data introduced into the data carrier is destined to update data introduced into the ROM memory of the data carrier during the production of the data carrier which are to be written into the non-volatile EEPROM memory or flash memory after the delivery of the data carrier to the customer, since, for example, between the production of the ROM mask and the delivery of the data carrier there have been made small changes in the respective data.

The portable data carrier in particular can be a chip card or a mobile phone card.

BRIEF DESCRIPTION OF THE DRAWINGS

In the following the invention is described on the basis of an embodiment with reference to the accompanying Figures.

DETAILED DESCRIPTION OF VARIOUS EMBODIMENTS

Figure 1:
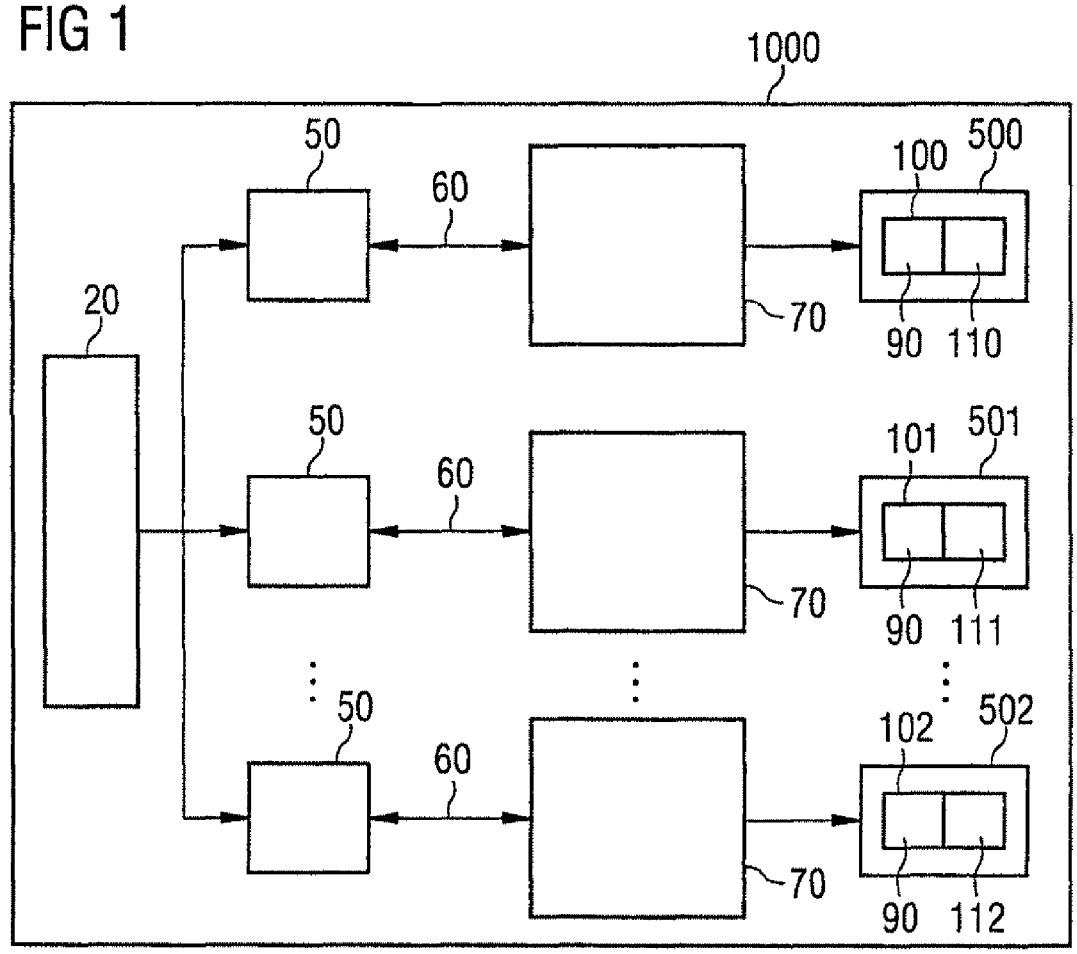
FIG. 1 shows a schematic sequence of operations of a virtual personalization process.

FIG. 1 schematically shows a sequence of operations of a virtual personalization process 1000 according to the invention. The entire process 1000 can take place on a commercial personal computer (PC). A simulation program 70, preferably Java card simulator or a comparable software or software/hardware combination, can completely simulate a real data carrier to be personalized, i.e. including all hardware features. Furthermore, the simulation program 70 is adapted to communicate via a virtual PC/SC interface 60 with virtual reading devices 50 which in turn can communicate with a personalization software 20 as it has been used until now with the personalization of real data carriers. In this way, a plurality of virtual data carriers 500, 501, 502 can be parallelly personalized on one PC, depending on the requirements and the capability of the PC 20 to 100 pieces. Here, the virtual data carriers are provided with personalization data 100, 101, 102, which each are composed of identical initialization data 90 and individualization data 110, 111, 112 individual for each data carrier. In this way, from each virtual data carrier 500, 501, 502 then an individual encrypted memory image can be generated.

Figure 2:
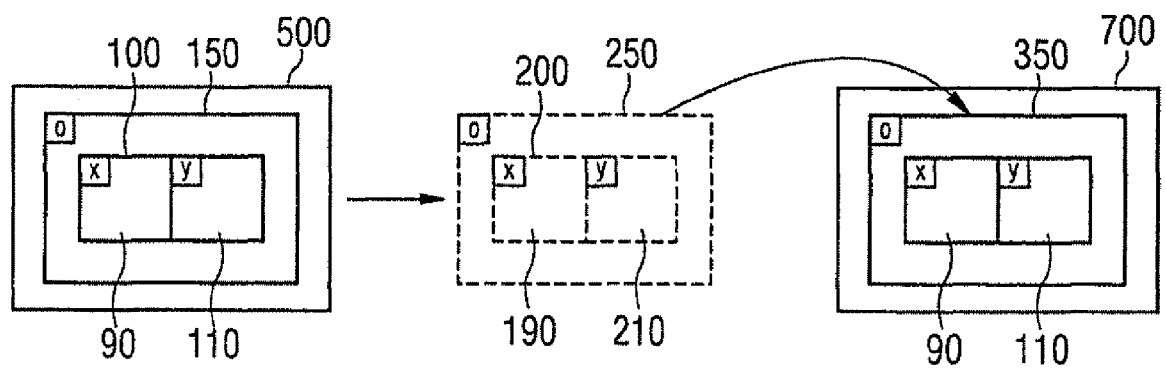
FIG. 2 schematically shows the production of a memory image of a personalized virtual data carrier and the introduction of it into a non-volatile memory of a real data carrier.

FIG. 2 schematically shows the generation of a bit-true memory image 250 of the simulated non-volatile memory 150 of a virtual data carrier 500. Besides the exact images 190, 210 or 200 of the initialization data 90, the individualization data 110 and the entire personalization data 100, the memory image 250 contains further information, for example the structure of the file system. In particular, the memory image 250 possesses the exact physical address in the corresponding memory for each memory content, in the case of the virtual data carrier, too, one speaks of physical addresses which exist in a simulated fashion there. In this way, now the memory image 250 generated by means of the virtual data carrier 500 can be directly introduced into a non-volatile memory 350 of a real data carrier 700 which has been simulated by the virtual data carrier 500. Corresponding data, such as for example personalization data 100, lie at exactly the same memory addresses as in the virtual data carrier 500. This is illustrated with the aid of the memory addresses 0, X and Y. Introducing a memory image 250 with the aid of the physical addresses can be carried out substantially faster than introducing the respective data by means of logical commands, because hardware functions can be directly used.

For this, the data carrier 700 to be personalized does not have to be pre-initialized in any way, i.e. in particular does not have to contain a file system yet. But a pre-initialization does not disturb the process, when the pre-initialization only involves such memory areas which differ from those into which the memory image is introduced for the personalization.

This achieves the result that the hitherto separated production steps of the initialization and individualization can be combined by virtualization. The direct introduction of the memory image 250 individual for each data carrier into the real data carrier 700 to be personalized substantially reduces the production time.

As described above, the personalization data 100, 101, 102 introduced into the real data carrier 700 per memory image 250 contain individualization data 110, 111, 112 and initialization data 90. The latter in particular can comprise application data, such as for example Java packages and Java applets.

Preferably, the personalization data 100, 101, 102 are introduced into the real data carrier 700 in an encrypted fashion and are decrypted there.

In a further embodiment it can be provided that the introduction of the memory image 250 into a real data carrier 700 is not effected during the production of the data carrier 700, but not until later, for example at an authority issuing the data carrier 700, such as e.g. a bank or a supermarket, or at the end user. The last case shall be described in more detail in the following.

When producing the real data carrier 700 only a small part of the personalization data 100, 101, 102 to be introduced is introduced into the non-volatile memory 350 of the data carrier 700, namely substantially only initialization data 90, and just only so much of them that the data carrier in the following, for example via the Internet, can establish a secure connection with the authority which initiates the further personalization. When the data carrier is a mobile phone card, expediently, only boot loader, basic GSM functions and the necessary keys and algorithms for the encryption and authentication are introduced into the data carrier 700, preferably per memory image. In this state the data carrier 700 is issued to the end user. The following further steps are subsequently carried out for completely personalizing the data carrier 700.

1. The end user connects the data carrier 700 to a PC by means of a suitable hardware.
2. The end user establishes a connection via Internet to the authority personalizing the data carrier 700, in the case of a mobile phone card for example via the mobile phone service provider directly to the computing center of the respective personalizing authority.
3. An application, for example a Java applet running in an Internet browser, establishes a connection between the data carrier 700 and the authority personalizing the data carrier 700. An interaction of the end user is not required.
4. The data carrier 700 authenticates itself against this authority and transfers data such as e.g. version number, type of card and the like and such data suitable for negotiating a session key for the following data transfer between the data carrier 700 and the personalizing authority, for example a public key.
5. The personalizing authority identifies the data carrier 700 on the basis of the received individual data of the data carrier 700 and identifies the memory image to be provided to this data carrier 700.
6. At the personalizing authority, as described above, a memory image 250 of the personalization data 100 not yet present on the data carrier to be personalized 700 is generated; the memory image 250 can also be already available.
7. The memory image 250 is encrypted individual for each data carrier and digitally signed.
8. The application transfers the memory image 250 via the established Internet connection to the data carrier 700, where it is introduced at the corresponding addresses directly into a non-volatile memory 350.
9. Decryption and the check of the signature then are effected on the data carrier 700.

The portion of personalization data which is introduced into the data carrier not until after the production at an authority issuing the data carrier or at the end user can be varied depending on the kind of data carrier to be personalized 700.

When the data carrier for example is a mobile phone card, it can be pre-personalized to such an extent that the end user at least can make phone calls and send and receive SMS messages. Then further functionalities can be introduced into the data carrier 700 in a personalization process initiated in the above-described fashion by the end user.

According to an embodiment, with a data carrier 700 having ROM and EEPROM during the production into still free memory in the ROM can be written so-called standard data. These are data, which in the following, when the data carrier 700 is used, are to be stored in an at least similar fashion in the EEPROM, but possibly have to undergo some changes which take place between the production of the ROM mask and the issue of the data carrier 700. When producing the data carrier 700 then only the part of the personalization data 100 is introduced into the data carrier 700, which contains information about how the standard data written from the ROM into the EEPROM, initiated in the following and by the end user, have to be updated.

The invention claimed is:

1. A method for the personalization of portable data carriers by writing personalization data into a non-volatile memory, comprising the steps of:
    carrying out the personalization as a virtual personalization in a virtual data carrier by using a simulation program which completely simulates a real data carrier to be personalized,
    generating a memory image as a bit-true image of a memory of the virtual data carrier, wherein the memory image contains exact images of initialization data of the memory of the virtual data carrier, the structure of the file system of the memory of the virtual data carrier, and exact physical addresses in a memory of the real data carrier to be personalized corresponding to each memory content of the virtual data carrier,
    introducing the memory image with the aid of its physical memory addresses into the memory of the real data carrier, and
    generating the personalization data by the virtual personalization containing individualization data.

2. The method according to claim 1, wherein the personalization data generated by the virtual personalization contain identical initialization data.

3. The method according to claim 2, wherein the initialization data contain application data including Java packages and Java applets.

4. The method according to claim 1, wherein the virtual personalization is carried out on a standard personal computer.

5. The method according to claim 1, wherein the virtual personalization is carried out by means of a Java card simulator.

6. The method according to claim 1, wherein the personalization data generated by the virtual personalization are encrypted on the virtual data carrier.

7. The method according to claim 6, wherein the encrypted data introduced as a memory image into the real data carrier are decrypted in the real data carrier.

8. The method according to claim 1, wherein the introduction of data for the personalization into the real data carrier is carried out at the authority issuing the data carrier or at the end user.

9. The method according to claim 8, wherein before the personalization the real data carrier is provided with the necessary data in order to establish a secure connection to an authority providing the data to be introduced for the personalization and to receive the personalization data to be introduced.

10. The method according to claim 8, wherein the data not introduced into the data carrier until at the authority issuing them or at the end user form only a part of the personalization data, the other part already having been introduced into the data carrier during the production of the data carrier.

11. The method according to claim 8, wherein a part of the personalization data introduced into the data carrier is destined to update data introduced into the ROM memory of the data carrier during the production of the data carrier which are to be written into a non-volatile memory, in particular an EEPROM memory or flash memory, after the delivery of the data carrier to a user.

12. The method according to claim 1, wherein the data carrier is formed as a chip card or mobile phone card.

* * * * *